United States Patent
Greenhalgh et al.

(10) Patent No.: US 10,613,869 B2
(45) Date of Patent: Apr. 7, 2020

(54) BRANCH TARGET ADDRESS PROVISION

(71) Applicant: Arm Limited, Cambridge (GB)

(72) Inventors: Peter Richard Greenhalgh, Cambridge (GB); Frederic Claude Marie Piry, Alpes Maritimes (FR); Jose Gonzalez-Gonzalez, Cambridge (FR)

(73) Assignee: ARM Limited, Cambridge (GB)

(*) Notice: Subject to any disclaimer, the term of this patent is extended or adjusted under 35 U.S.C. 154(b) by 50 days.

(21) Appl. No.: 15/939,722

(22) Filed: Mar. 29, 2018

(65) Prior Publication Data

US 2019/0303160 A1 Oct. 3, 2019

(51) Int. Cl.

| G06F 9/32 | (2018.01) |
|---|---|
| G06F 9/38 | (2018.01) |
| G06F 12/02 | (2006.01) |
| G06F 9/30 | (2018.01) |
| G06F 12/0862 | (2016.01) |

(52) U.S. Cl.
CPC ........ *G06F 9/3844* (2013.01); *G06F 9/30058* (2013.01); *G06F 9/3806* (2013.01); *G06F 9/383* (2013.01); *G06F 9/3808* (2013.01); *G06F 9/3846* (2013.01); *G06F 12/0862* (2013.01); *G06F 2212/6026* (2013.01); *G06F 2212/6028* (2013.01)

(58) Field of Classification Search
CPC ...... G06F 9/383; G06F 9/3842; G06F 9/3844; G06F 9/3846; G06F 9/3848; G06F 9/30058; G06F 9/3806; G06F 12/0897; G06F 12/0862; G06F 12/0864; G06F 12/121–124; G06F 11/1064; G06F 2212/6028; G06F 9/3808; G06F 2212/6026
USPC ......... 712/207, 237–240; 711/122, 128, 133, 711/213
See application file for complete search history.

(56) References Cited

U.S. PATENT DOCUMENTS

| 6,401,193 | B1 * | 6/2002 | Afsar | G06F 9/383 711/E12.057 |
|---|---|---|---|---|
| 8,171,260 | B2 * | 5/2012 | Gelman | G06F 9/3844 712/206 |
| 2008/0005543 | A1 * | 1/2008 | Rychlik | G06F 9/3806 712/239 |
| 2009/0216952 | A1 * | 8/2009 | Sonnelitter, III | G06F 12/121 711/125 |
| 2013/0332716 | A1 * | 12/2013 | Bonanno | G06F 9/3806 712/240 |

* cited by examiner

*Primary Examiner* — Daniel H Pan
(74) *Attorney, Agent, or Firm* — Nixon & Vanderhye, P.C.

(57) ABSTRACT

An apparatus and method of operating an apparatus are provided. The apparatus comprises execution circuitry to perform data processing operations specified by instructions and instruction retrieval circuitry to retrieve the instructions from memory, wherein the instructions comprise branch instructions. The instruction retrieval circuitry comprises branch target storage to store target instruction addresses for the branch instructions and branch target prefetch circuitry to prepopulate the branch target storage with predicted target instruction addresses for the branch instructions. An improved hit rate in the branch target storage may thereby be supported.

14 Claims, 4 Drawing Sheets

BRANCH TARGET ADDRESS PROVISION

TECHNICAL FIELD

The present disclosure relates to data processing. In particular, the present disclosure relates to branch target provision.

DESCRIPTION

In a data processing apparatus which may encounter branch instructions in the sequence of instructions which it executes, prediction mechanisms may be provided to maintain a temporary storage of branch target addresses (i.e. the program instruction addresses to which the program flow changes when branch are taken) to enable (in association with branch prediction mechanisms) the fetching of an uninterrupted sequence of instructions from memory to be performed (since otherwise delay would be incurred by evaluating the target address for a branch instruction). Indeed, such branch target storage has become increasingly sophisticated and may for example comprise a hierarchy of branch target storage units (also referred to as branch target buffers (BTBs)). Such branch target storage is thus in itself becoming a significant overhead in terms of circuit usage and energy consumption.

SUMMARY

In one example embodiment described herein there is an apparatus comprising: execution circuitry to perform data processing operations specified by instructions; and instruction retrieval circuitry to retrieve the instructions from memory, wherein the instructions comprise branch instructions and wherein the instruction retrieval circuitry comprises branch target storage to store target instruction addresses for the branch instructions; and branch target prefetch circuitry to prepopulate the branch target storage with predicted target instruction addresses for the branch instructions.

In another example embodiment described herein there is a method of operating a data processing apparatus comprising: retrieving instructions from memory, wherein the instructions comprise branch instructions; performing data processing operations specified by the instructions; storing target instruction addresses for the branch instructions in branch target storage; and prefetching predicted target instruction addresses for the branch instructions to prepopulate the branch target storage.

In another example embodiment described herein there is an apparatus comprising: means for retrieving instructions from memory, wherein the instructions comprise branch instructions; means for performing data processing operations specified by the instructions; means for storing target instruction addresses for the branch instructions; and means for prefetching predicted target instruction addresses for the branch instructions to prepopulate the means for storing target instruction addresses.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Figure 1:
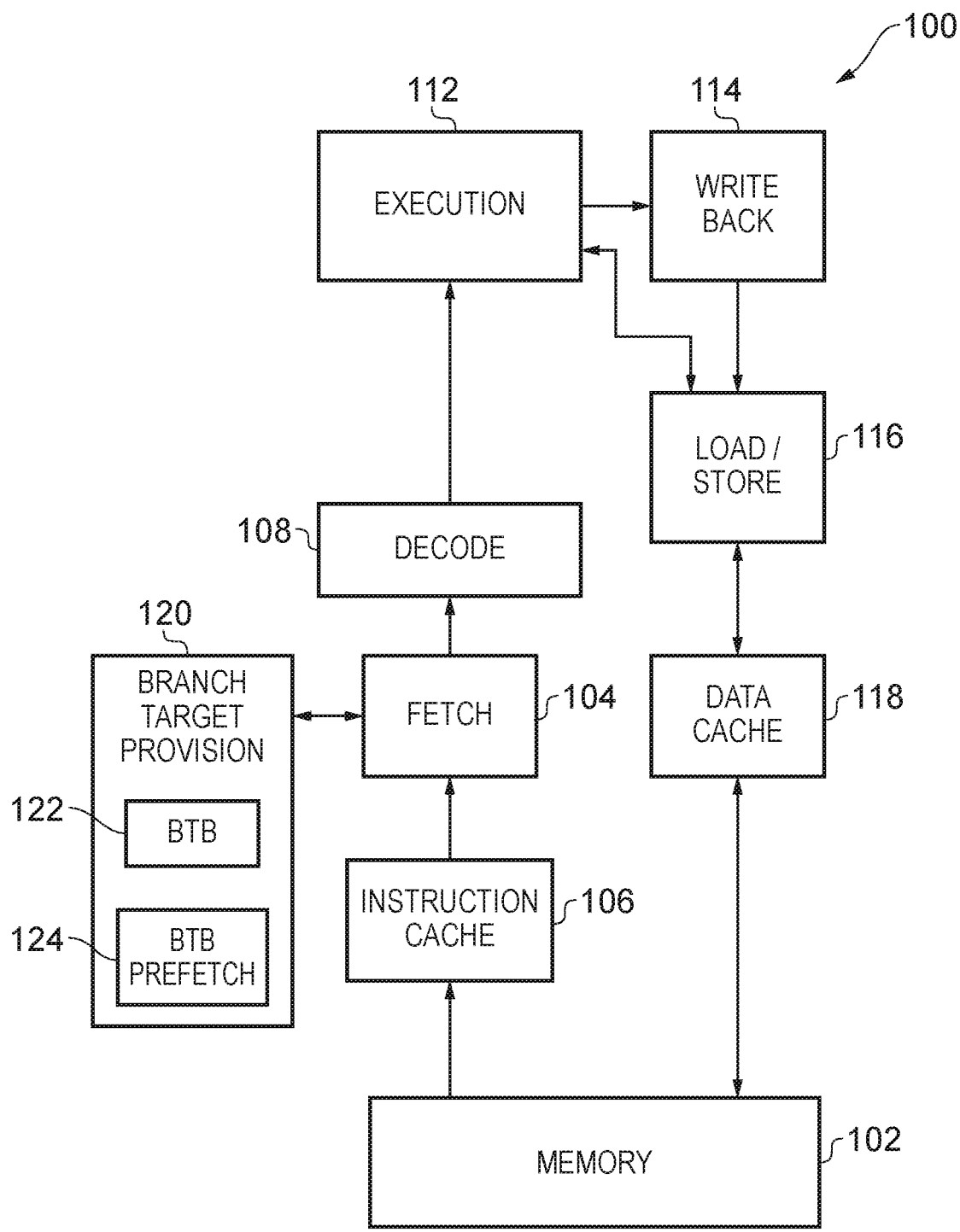
FIG. 1 schematically illustrates a data processing apparatus in one embodiment.

Before discussing the embodiments with reference to the accompanying figures, the following description of embodiments is provided.

In accordance with one example configuration there is provided an apparatus comprising: execution circuitry to perform data processing operations specified by instructions; and instruction retrieval circuitry to retrieve the instructions from memory, wherein the instructions comprise branch instructions and wherein the instruction retrieval circuitry comprises branch target storage to store target instruction addresses for the branch instructions; and branch target prefetch circuitry to prepopulate the branch target storage with predicted target instruction addresses for the branch instructions. The present techniques recognise that it is desirable for the instruction retrieval circuitry of the apparatus to be able to retrieve instructions from memory without interruption and that for this to happen, in particular when the instructions comprise branch instructions, the required target instruction addresses for the branch instructions need to be available in the branch target storage. However, the present techniques further recognise that when seeking to increase the capacity of the branch target storage (whether in terms of a single branch target storage device or a hierarchy of branch target storage devices) this approach is constrained by a trade off between the capacity of the branch target storage and its access latency. Essentially, the larger the branch target storage is, the longer it takes to determine if a required target instruction address is present within it. In this context, the present techniques additionally provide branch target prefetch circuitry which is arranged to pre-populate the branch target storage with predicted target instruction addresses for the branch instructions. This approach supports the hit rate in the branch target storage, meaning that power can be saved because less work is performed down a wrong path before being corrected, and secondly allows the branch target storage to be kept relatively small in capacity and therefore to maintain a low access latency, such that bubbles in the pipeline of the execution circuitry are avoided.

It should be appreciated on the basis of the above description that the present techniques can improve the performance of the branch target storage whatever the absolute access latency for the branch target storage is, but the present techniques may find particular use within a data processing apparatus which has branch target storage that can avoid pipeline bubbles entirely, i.e. has a zero-cycle access latency. That is to say it is able to respond to a lookup for a target instruction address within the same processing cycle. Accordingly, in some embodiments the branch target storage is a zero-cycle-latency branch target storage responsive to a look-up for a target instruction address initiated in a processing cycle of the apparatus to provide the target instruction address within the processing cycle, when the target instruction address is present in the branch target storage. Accordingly, in such embodiments when the branch target prefetch circuitry of the present techniques enables the branch target storage to be prepopulated with the required target instruction addresses, these can be provided without causing a bubble in the execution pipeline.

The branch target prefetch circuitry may operate in a variety of ways, but in some embodiments comprises instruction pattern recognition circuitry to monitor the instructions retrieved from memory and to select the predicted target instruction addresses in dependence on at least one identified pattern of instructions in the instructions retrieved from memory. For example, where the instruction pattern recognition circuitry identifies a repeating pattern of instructions retrieved from the memory (as may for example be the case when the executed program contains a loop) the branch target prefetch circuitry can select the predicted target instruction addresses with which to pre-populate the branch target storage such that branch instructions encountered will have their corresponding target addresses already stored in the branch target storage.

As mentioned above the branch target storage may take a variety of forms and indeed in some embodiments the apparatus further comprises a branch target storage hierarchy, wherein the branch target storage hierarchy comprises the branch target storage and at least one further level of branch target storage. Delays in determining the target address for a branch instruction impact on performance (by introducing bubbles into the execution pipeline) and the provision of a branch target storage hierarchy can reduce the frequency with which this occurs.

The branch target storage hierarchy may have a variety of configurations but in some embodiments the instruction retrieval circuitry is responsive to an indication that a target instruction address is not present in the branch target storage to cause a request for the target instruction address to be issued to the at least one further level of branch target storage of the branch target storage hierarchy.

The levels of the branch target storage may be variously configured with respect to one another, but in some embodiments the at least one further level of branch target storage has a greater storage capacity than the branch target storage. Similarly in some embodiments the at least one further level of branch target storage has longer access latency than the branch target storage. As mentioned above greater storage capacity must usually be traded off against a corresponding longer access latency.

Recognising the undesirability of the longer access latency associated with a branch target storage of greater storage capacity, in some embodiments the branch target storage hierarchy is responsive to a request for a target instruction address to initiate a look-up for the target instruction address in the branch target storage and in the at least one further level of branch target storage in a same processing cycle. In other words, the look up in the at least one further level of branch target storage is initiated in parallel with the lookup in the branch target storage in order to begin this as soon as possible. Of course, if the lookup in the branch target storage is successful then lookups in the at least one further level of a branch target storage can then be aborted.

In some embodiments the branch target prefetch circuitry comprises prediction confidence circuitry to maintain a prefetch confidence value in dependence on a hit rate for the predicted target instruction addresses with which the branch target storage is prepopulated. Accordingly, a high hit rate in the branch target storage, indicating that the proposed pre-population techniques discussed herein are operating successfully, will result in a confidence value which reflects this.

This confidence value may be made use of in a variety of ways, but in some embodiments the branch target prefetch circuitry is responsive to the prefetch confidence value exceeding a threshold confidence value to suppress the look-up for the target instruction address in the at least one further level of branch target storage from being initiated when the look-up for the target instruction address is initiated in the branch target storage. The present techniques recognise that although it may be beneficial in terms of performance to initiate look ups in the at least one further level of branch target storage when the lookup for the target instruction address is initiated in the branch target storage, this comes at the price of greater energy consumption within the apparatus and the use of a threshold confidence value to compare against the prefetch confidence value enables this parallel lookup to be switched off when it is determined that performance based on an initial lookup in the branch target storage alone will be sufficient. Also, when the prefetcher allocates a branch target that is not useful, this allocation will knocks out a (potentially) more useful entry, which could also result in a performance drop.

It should be recognised that the branch target prefetch circuitry discussed above is associated with the branch target storage, i.e. in a branch target storage hierarchy with the first level of that hierarchy, but that causing pre-population of branch target addresses in the branch target storage may in some embodiments also cause pre-population within at least one further level of a branch target storage hierarchy by virtue of the mechanisms used to bring branch target addresses into the branch target storage. Nevertheless, depending on the implementation it may be appropriate to take more direct control of the content of each level of the branch target storage hierarchy and accordingly in some embodiments the instruction retrieval circuitry comprises at least one further branch target prefetch circuitry to prepopulate the at least one further level of branch target storage with predicted target instruction addresses for the branch instructions.

The branch target storage may itself take a variety of forms but in some embodiments is a content-addressable-memory structure. In other embodiments the branch target storage is a randomly-addressable-memory structure.

In accordance with another example configuration there is provided a method of operating a data processing apparatus comprising: retrieving instructions from memory, wherein the instructions comprise branch instructions; performing data processing operations specified by the instructions; storing target instruction addresses for the branch instructions in branch target storage; and prefetching predicted target instruction addresses for the branch instructions to prepopulate the branch target storage.

In accordance with another example configuration there is provided an apparatus comprising: means for retrieving instructions from memory, wherein the instructions comprise branch instructions; means for performing data processing operations specified by the instructions; means for storing target instruction addresses for the branch instructions; and means for prefetching predicted target instruction addresses for the branch instructions to prepopulate the means for storing target instruction addresses.

Particular embodiments will now be described with reference to the figures.

FIG. 1 illustrates a data processing apparatus 100 in accordance with one embodiment. This is an apparatus the operation of which is defined by a program comprising a set of data processing instructions which are stored in a memory 102. In a manner with which one of ordinary skill in the art will be familiar, fetch circuity 104 of the apparatus uses a program counter to retrieve instructions from the memory 102, these being cached in an instruction cache 106 to reduce the retrieval latency when a given instruction is required repeatedly. The instructions are decoded by decoding circuitry 108 before being executed by the execution circuitry 112. A write back stage 114 is shown which accesses the storage capabilities of a load/store unit 116 to cause data values updated by the data processing operations of the execution circuitry 112 to be returned to the correct storage locations in memory 102. The execution circuitry 112 also makes use of the load/store circuitry 116 in order to retrieve data values from memory 102 for processing. A data cache 118 is also provided to avoid the full access latency of writing frequently accessed data values back to the memory 102 or retrieving them from memory 102. Returning to a consideration of the fetch circuitry 104, where this is an apparatus which encounters branch instructions, the apparatus is also provided with various capabilities relating to branch prediction, seeking to enable it to provide the execution circuitry 112 with an uninterrupted sequence of instructions for execution, despite the fact that the occurrence of branch instructions (when taken) may cause deviation in the sequence of instructions from a sequential flow. Note that the term branch prediction is used here to refer generally to both branch prediction itself, i.e. predicting whether a branch will be taken or not (T/NT) and also to branch target address prediction, i.e. to providing the target address to which the program flow will jump when a branch is taken. Generally one of ordinary skill in the art will be familiar with such techniques and a detailed description and illustration thereof is dispensed with here for brevity and clarity. However, of particular relevance in the present context is the branch target provision circuitry 120 associated with the fetch circuitry 104. This comprises both branch target storage (BTB—branch target buffer) 122 and BTB prefetch circuitry 124. As will be described in more detail with reference to the figures which follow, the BTB 122 holds entries comprising branch target addresses, such that when the program counter used by the fetch circuitry 104 indicates that an upcoming instruction for execution is a branch instruction the BTB 122 may be able to quickly provide the fetch circuitry with the target address of that branch instruction, such that instruction fetching may continue from this target address and no bubble is introduced into the execution pipeline. In order to support this the branch target provision circuitry 120 is further provided with the BTB prefetch circuitry 124 which monitors the program counter values and when a recognised pattern is encountered causes appropriate branch target addresses to be prepopulated into the BTB 122 to seek to avoid misses in this storage structure.

Figure 2:
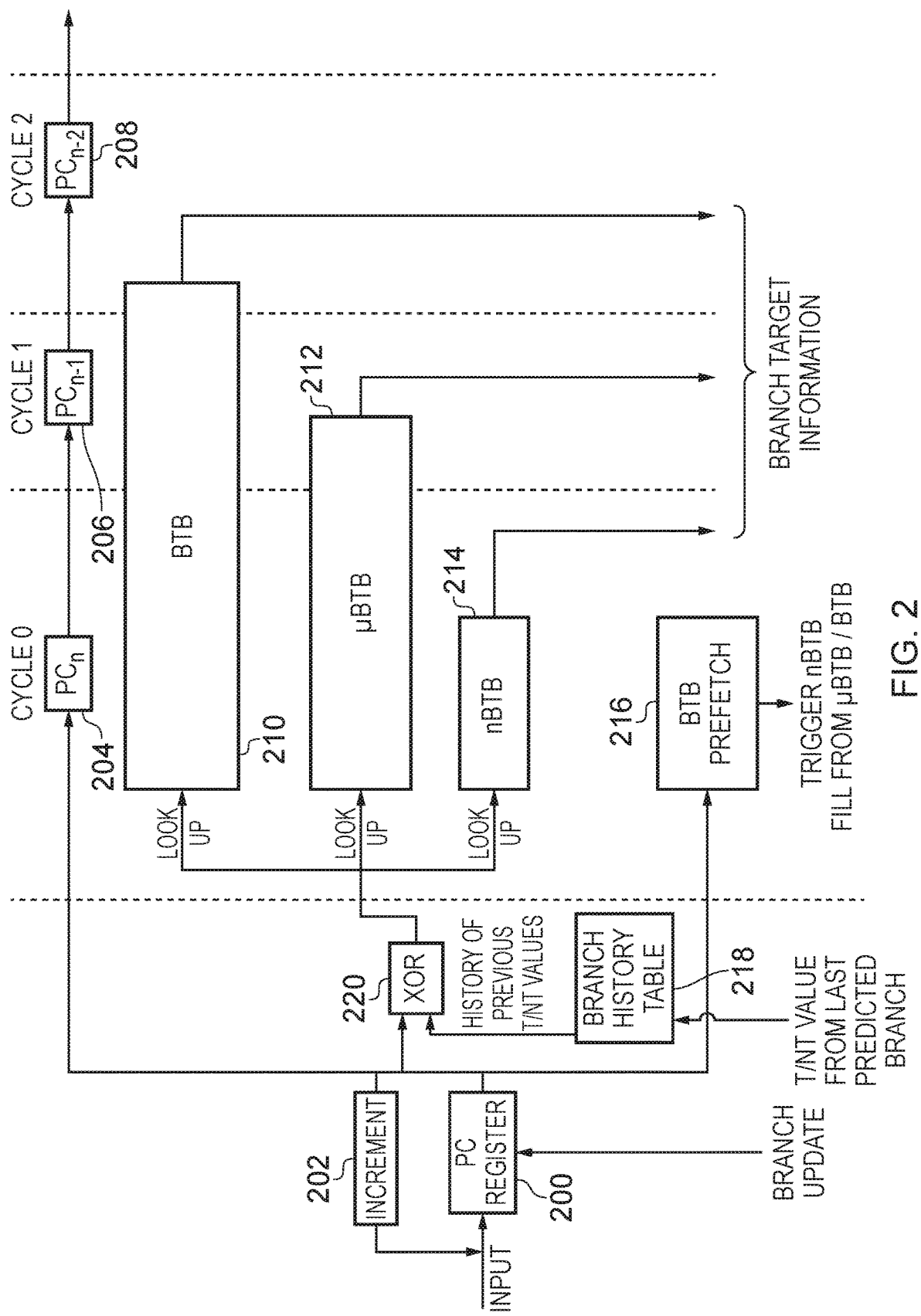
FIG. 2 schematically illustrates the manner in which program counter values are updated and used in branch target prediction circuitry on a cycle-by-cycle basis in one embodiment.

FIG. 2 schematically illustrates the operation of the branch target provision circuitry 120 (the BTB pre-population) and the lookup in the BTB hierarchy in one embodiment in more detail. A current PC value is held in a PC register 200, which may for example form part of the fetch circuitry 104 of FIG. 1. The PC register 200 has an input which enables the PC register to be arbitrarily set, for example when a new sequence of program instructions is to be executed. In general operation however the value held in the PC register 200 is updated by increment circuitry 202, which may also form part of the fetch circuitry 104, and (absent any branch instructions being encountered) will linearly increment the value held. It should be noted that this increment may take a variety of forms, for example simply being a single unit increment of the value held or in order to allow groups of instructions to be fetch as a block may step in predefined increments, each corresponding to multiple instructions. The PC value is variously used by various components as shown in FIG. 2. Further note that the schematic illustration of FIG. 2 sub-divides into vertical bands corresponding to subsequent processing cycles within the apparatus. This is particularly done to illustrate the greater access latency associated with the different branch target buffer (BTB) components, as will be discussed more below. A sequence of registers 204, 206, 208 are provided to pass subsequent program counter values through the pipelined system of the data processing apparatus. The branch history table 218 receives as input the Taken/Not-Taken (T/NT) value from the last branch that was predicted. The output of the branch history table 218 is a history of previous T/NT values (i.e. more than one T/NT—a history of T/NT). The program counter value is received from the PC register 200 by XOR 220, which hashes this value with the branch history information from the branch history table 218 and the output is used as an address to look up in the three levels of a branch target storage hierarchy, namely the branch target buffer (BTB) 210, the micro branch target buffer (nBTB) 212, and the nano branch target buffer (nBTB) 214. As illustrated by their relative sizes in FIG. 2 and the number of cycles with which they are shown to cross, these storage components represent a hierarchy in terms of both storage capacity and access latency. Being the smallest, and therefore having the lowest access latency, the nBTB 214 is able to respond to the lookup within the same cycle (cycle 0) with a corresponding target address if that branch target address is already stored in an entry of the nBTB 214. The µBTB 212 requires an additional cycle to provide its response and the full BTB 210 requires two additional cycles to respond. The program counter value is also provided to branch target buffer prefetch circuitry 216 which may trigger a prefetching of content for the nBTB from the µBTB/BTB in dependence on observed patterns.

Figure 3:
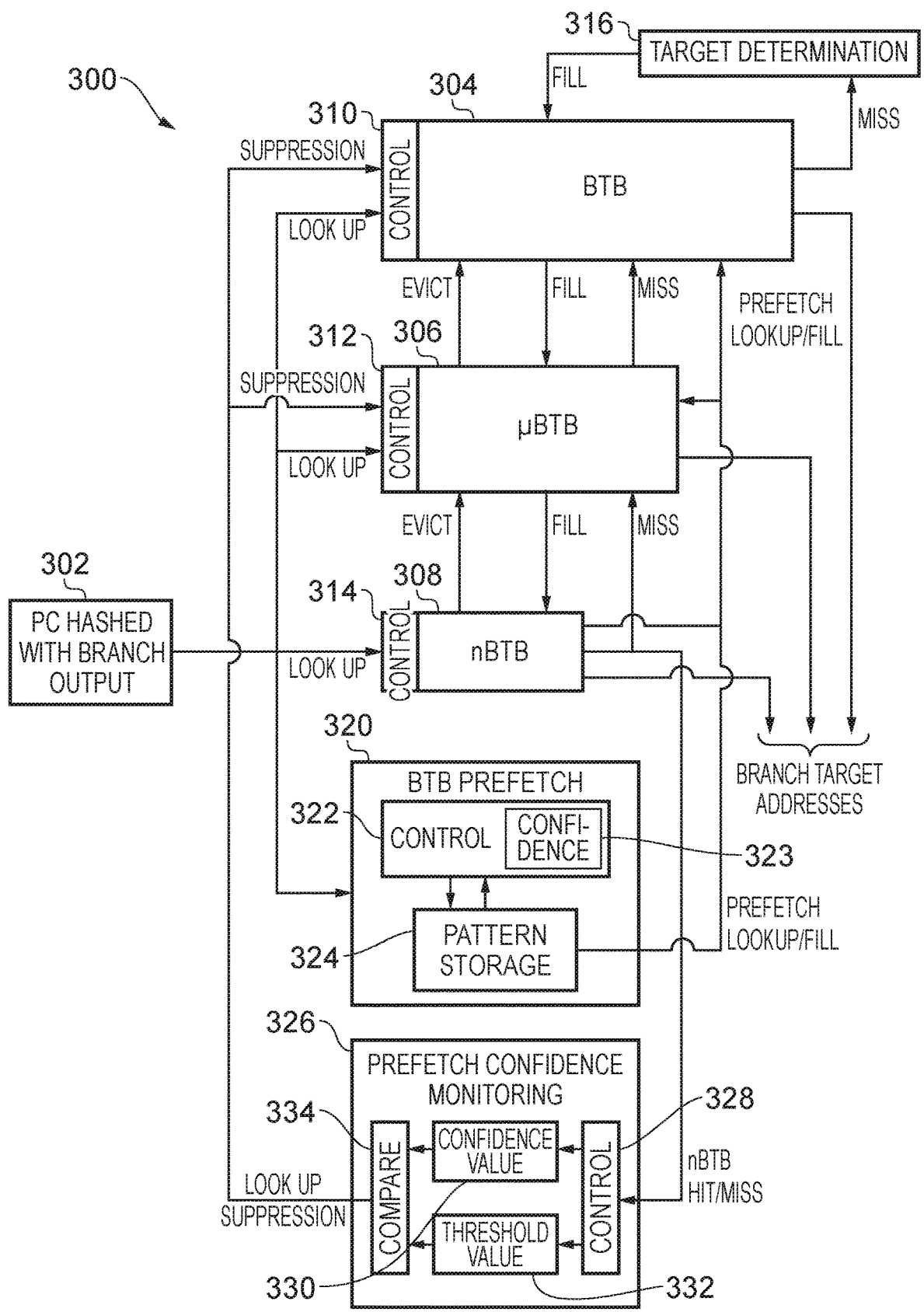
FIG. 3 schematically illustrates in more detail the configuration of branch target prediction circuitry in one embodiment.

FIG. 3 schematically illustrates a data processing apparatus 300 in one embodiment, which provides further detail of the branch target storage hierarchy, and of the BTB prefetch mechanism. The program counter value is hashed with the branch output (e.g. XOR'd with T/NT) and passed to each level of the branch target storage hierarchy, i.e. to the BTB 304, the µBTB 306, and the nBTB 308. This lookup trigger is received by associated control circuitry 310, 312, and 314 of each BTB level respectively, although note that the control circuitry 310, 312 associated with the BTB 304 and the µBTB 306 also receives a lookup suppression signal, which will be described in more detail below, and can cause suppression of these lookups. Nevertheless, when a lookup is triggered in one or more of the BTB levels and when a hit results a corresponding branch target address is output. It should also be noted that the BTB levels operate much in the manner of a cache hierarchy, with which one of ordinary skill in the art will be familiar, such that when a miss occurs in the nBTB 308 this miss signal is propagated to the next BTB level, namely the µBTB 306. Similarly when a miss occurs in the µBTB 306, this miss indication is propagated to the next level, namely the BTB 304. Further, also in the manner of a cache hierarchy, entries in the respective levels of the branch target storage hierarchy are evicted from lower levels of the hierarchy (when not used frequently enough or merely replaced when storage for new entry is required). Similarly, entries from higher levels in the hierarchy (nearer to the top of the page in FIG. 3) are provided to lower levels to fill entries in those levels when the entries are provided in response to a request which missed in a lower level. Finally, note that in connection with the highest level of the hierarchy, namely the BTB 304, when a miss occurs at this level this is signalled to target determination circuitry 316 which must then examine the branch instruction referred to and determine its branch target in order for a corresponding entry to be made in the BTB 304. This entry can then also be propagated down the hierarchy to the μBTB 312 and the nBTB 308.

BTB prefetch circuitry 320 is also provided. This also receives the program counter value hashed with the branch output 302 and under the control of its control circuitry 322 this value is compared against the content of the pattern storage 324. Accordingly, the BTB prefetch circuitry 320 is arranged to track the program flow and can therefore cause particular branch target addresses to be prepopulated in the nBTB 308 before they are required. For example, when a previously observed pattern of values 302 is observed again, an expected upcoming branch target address can be prefetched. A confidence threshold 323 is also used to define how easily this prefetching is triggered. It would be possible for the pattern storage circuitry 324 to make use of the miss mechanism by which the nBTB 308 signals a miss to the μBTB 306. In other words when the BTB prefetch circuitry 320 determines that a particular branch target address should be brought into the nBTB 308, it could make use of this miss mechanism in order to cause the required branch target address to be brought into the nBTB 308. However, in this embodiment a dedicated look up path is provided from BTB prefetch circuitry 320 to cause a fill in the nBTB 308 from either the μBTB 306 or the BTB 304. The actions of the prefetcher thus do not inhibit performance on the conventional miss/fill path. The apparatus 300 shown in FIG. 3 also comprises prefetch confidence monitoring circuitry 326. This receives hit/miss indications relating to the operation of the nBTB 308. These are received by its control circuitry 328. The control circuitry 328 updates a confidence value held in storage 330 provided for that purpose. The control circuitry 328 is also capable of setting a threshold value 332. Accordingly, in response to hits in the nBTB 308 being indicated the confidence value 330 increases, and conversely it falls in response to miss indications. The prefetch monitoring circuitry 326 is further provided with comparison circuitry 334 which compares the confidence value 330 against the threshold value 332. When the confidence value 330 exceeds the threshold value 332 a lookup suppression signal is generated which is received by the control circuitry 310 of the BTB 304 and the control circuitry 312 of the μBTB 306. Thus when the confidence value 330 is sufficiently high, indicating that the nBTB 308 is sufficiently accurate that the μBTB 306 (and indeed the BTB 304) is rarely being used, look up in these cache levels of the cache hierarchy can be suppressed gaining a power saving.

Figure 4:
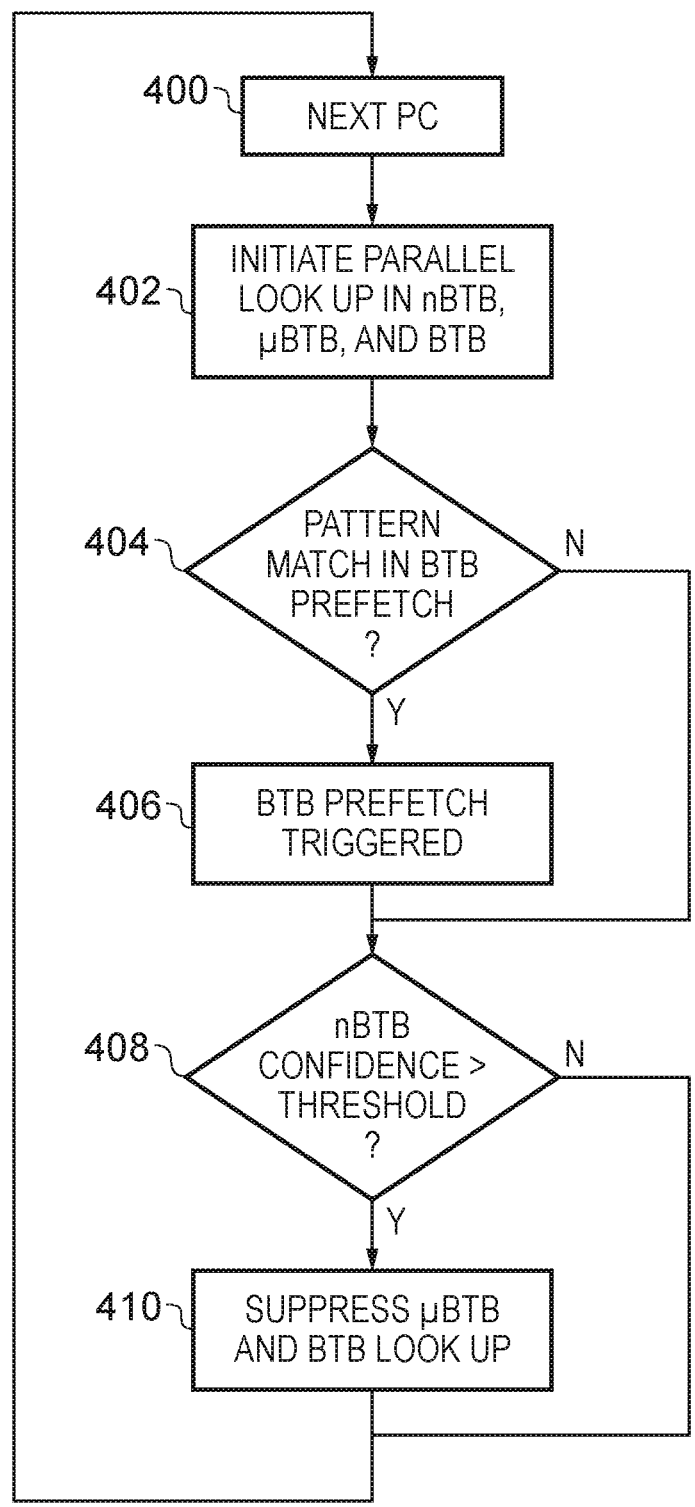
FIG. 4 is a flow diagram showing a sequence of steps which are taken in one method embodiment.

FIG. 4 is a flow diagram showing a sequence of steps which are taken in one method embodiment. The flow can be considered to begin at step 400, where a next program counter value (PC) is received. Based on this PC value (e.g. hashed with branch history) look ups are initiated at step 402 in parallel in the nBTB, the μBTB and in the (main) BTB. At step 404 it is determined if a pattern match has been identified in the BTB prefetch unit. If it has not, then the flow proceeds to step 408, but if a known pattern is identified then at step 406 the BTB prefetch is triggered to seek to bring a branch target address which is expected (on the basis of the pattern match) to be required soon into the nBTB. At step 408 it is determined if the nBTB confidence value exceeds the set threshold and if it does then, at step 410, suppression of the lookup initiated in the μBTB and the (main) BTB (at step 402) is suppressed. Step 410 is bypassed if the nBTB confidence does not excess the threshold. The flow then returns to step 400.

In brief overall summary an apparatus and method of operating an apparatus are provided. The apparatus comprises execution circuitry to perform data processing operations specified by instructions and instruction retrieval circuitry to retrieve the instructions from memory, wherein the instructions comprise branch instructions. The instruction retrieval circuitry comprises branch target storage to store target instruction addresses for the branch instructions and branch target prefetch circuitry to prepopulate the branch target storage with predicted target instruction addresses for the branch instructions. An improved hit rate in the branch target storage may thereby be supported.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

We claim:

1. Apparatus comprising:
   execution circuitry to perform data processing operations specified by instructions; and
   instruction retrieval circuitry to retrieve the instructions from memory, wherein the instructions comprise branch instructions and wherein the instruction retrieval circuitry comprises:
   branch target storage to store target instruction addresses for the branch instructions; and
   branch target prefetch circuitry comprising instruction pattern recognition circuitry to monitor the instructions retrieved from memory and to select predicted target instruction addresses in dependence on at least one identified pattern of instructions in the instructions retrieved from memory;
   wherein the branch target prefetch circuitry is configured to prepopulate the branch target storage with the predicted target instruction addresses for the branch instructions.

2. The apparatus as claimed in claim 1, wherein the branch target storage is a zero-cycle-latency branch target storage responsive to a look-up for a target instruction address initiated in a processing cycle of the apparatus to provide the target instruction address within the processing cycle, when the target instruction address is present in the branch target storage.

3. The apparatus as claimed in claim 1, further comprising a branch target storage hierarchy, wherein the branch target storage hierarchy comprises the branch target storage and at least one further level of branch target storage.

4. The apparatus as claimed in claim 3, wherein the instruction retrieval circuitry is responsive to an indication that a target instruction address is not present in the branch target storage to cause a request for the target instruction address to be issued to the at least one further level of branch target storage of the branch target storage hierarchy.

5. The apparatus as claimed in claim 3, wherein the at least one further level of branch target storage has greater storage capacity than the branch target storage.

6. The apparatus as claimed in claim 3, wherein the at least one further level of branch target storage has longer access latency than the branch target storage.

7. The apparatus as claimed in claim 3, wherein the branch target storage hierarchy is responsive to a request for a target instruction address to initiate a look-up for the target instruction address in the branch target storage and in the at least one further level of branch target storage in a same processing cycle.

8. The apparatus as claimed in claim 7, wherein the branch target prefetch circuitry comprises prediction confidence circuitry to maintain a prefetch confidence value in dependence on a hit rate for the predicted target instruction addresses with which the branch target storage is prepopulated.

9. The apparatus as claimed in claim 8, wherein the branch target prefetch circuitry is responsive to the prefetch confidence value exceeding a threshold confidence value to suppress the look-up for the target instruction address in the at least one further level of branch target storage from being initiated when the look-up for the target instruction address is initiated in the branch target storage.

10. The apparatus as claimed in claim 3, wherein the instruction retrieval circuitry comprises at least one further branch target prefetch circuitry to prepopulate the at least one further level of branch target storage with predicted target instruction addresses for the branch instructions.

11. The apparatus as claimed in claim 1, wherein the branch target storage is a content-addressable-memory structure.

12. The apparatus as claimed in claim 1, wherein the branch target storage is a randomly-addressable-memory structure.

13. A method of operating a data processing apparatus comprising:
retrieving instructions from memory, wherein the instructions comprise branch instructions;
performing data processing operations specified by the instructions;
storing target instruction addresses for the branch instructions in branch target storage;
monitoring the instructions retrieved from memory and selecting predicted target instruction addresses in dependence on at least one identified pattern of instructions in the instructions retrieved from memory; and
prefetching the predicted target instruction addresses for the branch instructions to prepopulate the branch target storage.

14. Apparatus comprising:
means for retrieving instructions from memory, wherein the instructions comprise branch instructions;
means for performing data processing operations specified by the instructions;
means for storing target instruction addresses for the branch instructions;
means for monitoring the instructions retrieved from memory and selecting predicted target instruction addresses in dependence on at least one identified pattern of instructions in the instructions retrieved from memory; and
means for prefetching the predicted target instruction addresses for the branch instructions to prepopulate the means for storing target instruction addresses.

* * * * *